June 11, 1929.  J. T. RAMSDEN  1,716,737
TURNTABLE MOLDING MACHINE
Filed Feb. 16, 1926   7 Sheets-Sheet 1

WITNESS:

INVENTOR
John T. Ramsden
BY
ATTORNEY.

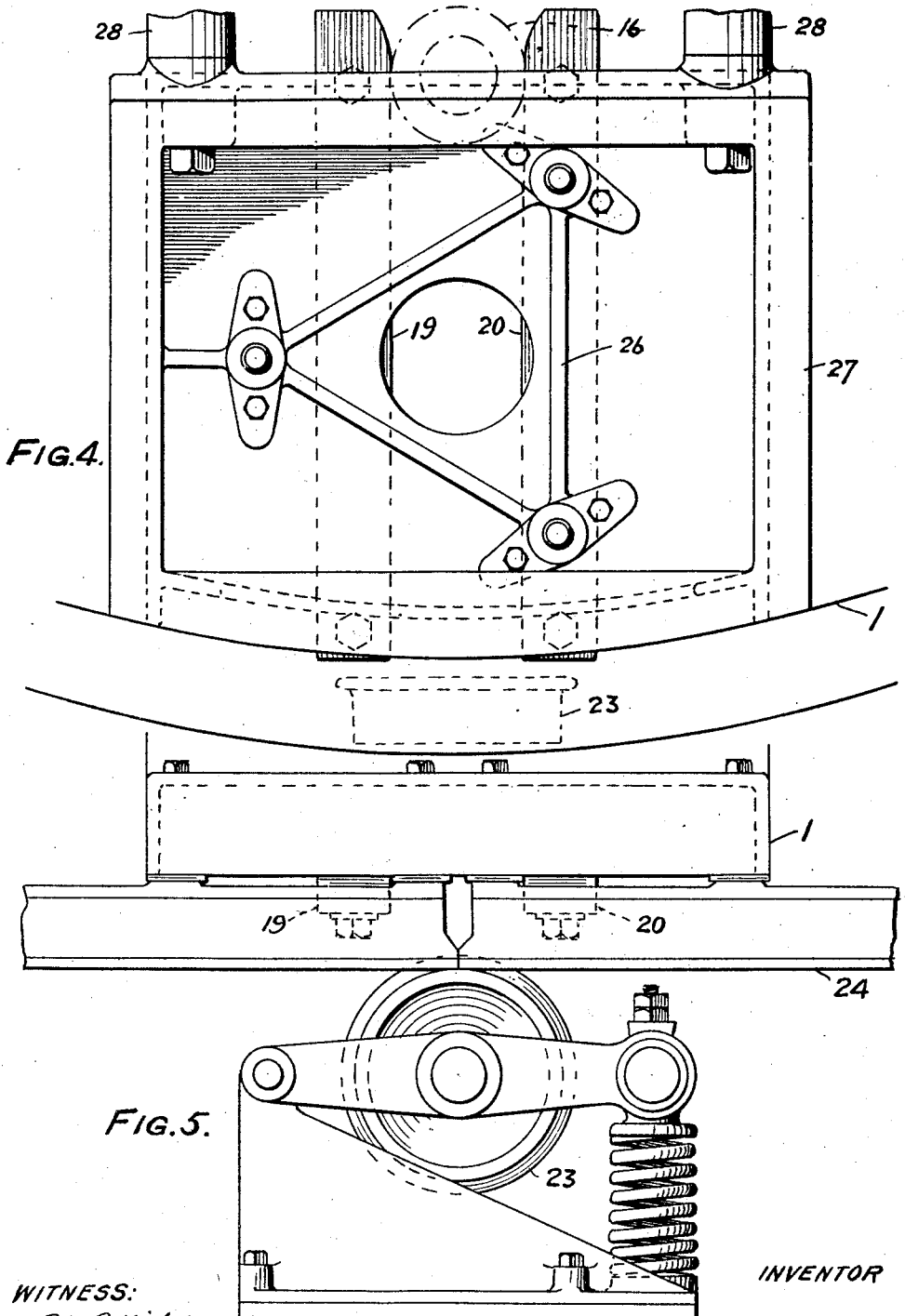

June 11, 1929.  J. T. RAMSDEN  1,716,737
TURNTABLE MOLDING MACHINE
Filed Feb. 16, 1926  7 Sheets-Sheet 5

WITNESS:

INVENTOR
John T. Ramsden
BY
Augustus B. Stoughton
ATTORNEY.

Patented June 11, 1929.

1,716,737

UNITED STATES PATENT OFFICE.

JOHN T. RAMSDEN, OF PHILADELPHIA, PENNSYLVANIA, ASSIGNOR TO THE TABOR MANUFACTURING COMPANY, A CORPORATION OF PENNSYLVANIA.

TURNTABLE MOLDING MACHINE.

Application filed February 16, 1926. Serial No. 88,508.

The principal objects of the present invention are to provide for properly and accurately turning the table with the required intermittent motion and with the required dwells in that motion; to provide for stopping the turntable whenever required; to provide for turning the turntable backward as in the event of accident; to provide for properly disposing of spilled sand; to provide for relieving the table from the shocks and jars to which it is subjected; and to provide for operating the turntable step by step with gradually increasing and decreasing speeds between the steps and with positive positions of rest at the steps. Other objects of the invention will appear from the following description at the end of which the invention will be claimed and which will be given in connection with the embodiment of the invention chosen for the sake of illustration in the accompanying drawings forming part hereof and in which Figure 1 is a top or plan view, largely diagrammatic in character, of apparatus embodying features of the invention.

Fig. 4 is an enlarged top or plan view of the part of the turntable shown at the lefthand in Fig. 2.

Fig. 5 is a front elevation of parts shown in Fig. 4.

Figure 1:
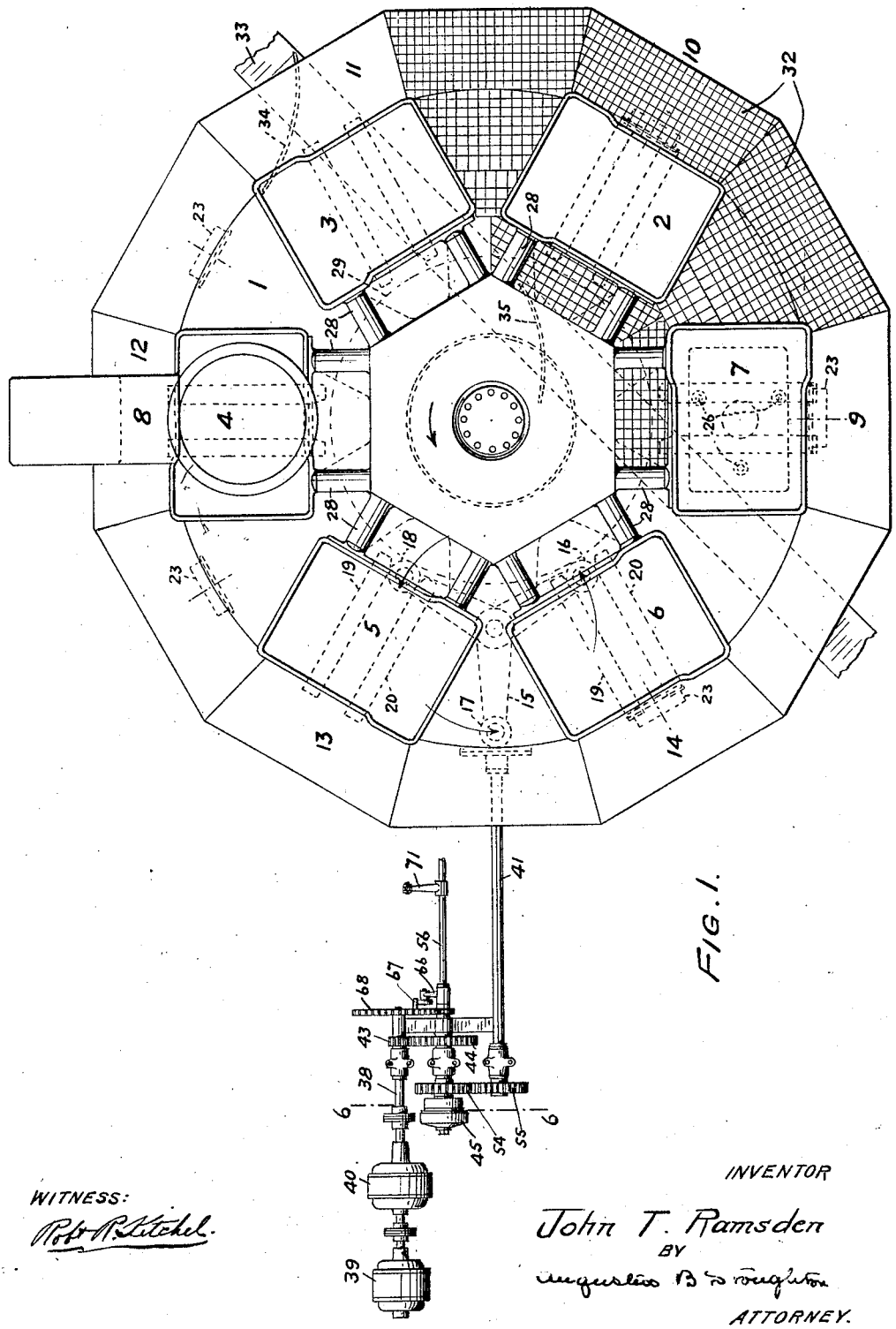
Figure 2:
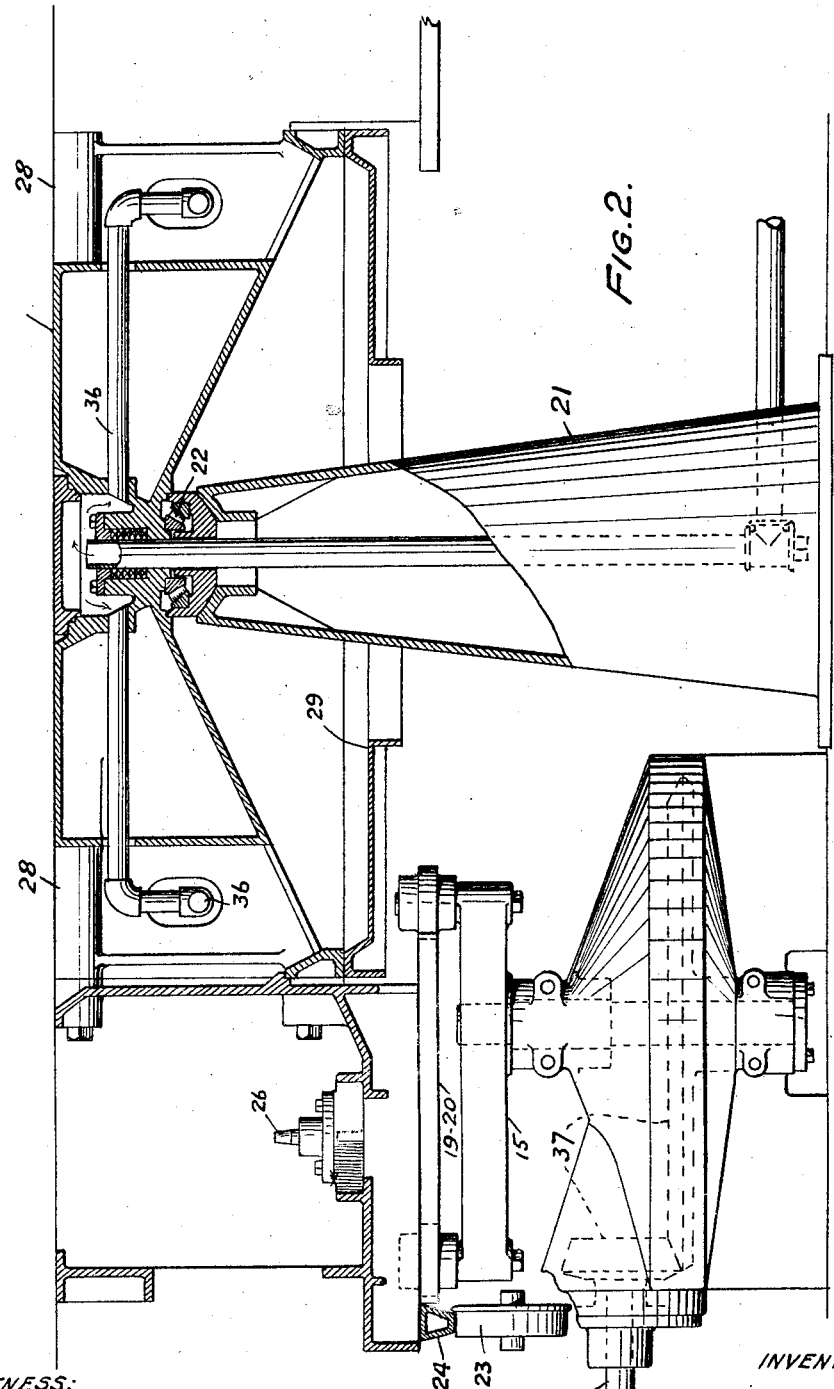
Fig. 2 is a view drawn to an enlarged scale and partly in section illustrating a part of the turntable and a part of the driving gear or mechanism and taken generally lengthwise of the sheet upon which Fig. 1 appears.
Figure 3:
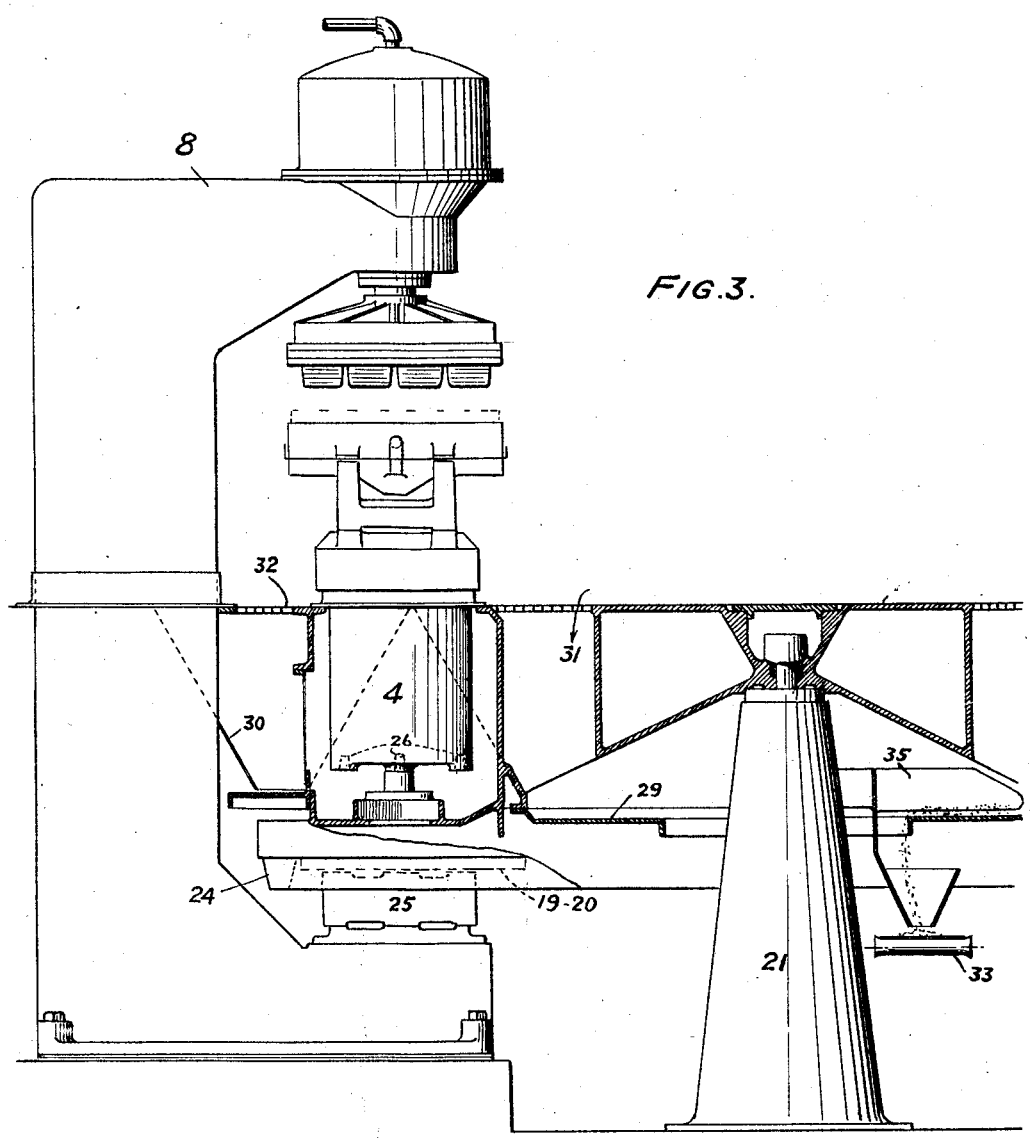
Fig. 3 is a view similar to Fig. 2 but taken generally crosswise of the sheet upon which Fig. 1 appears.
Figure 6:
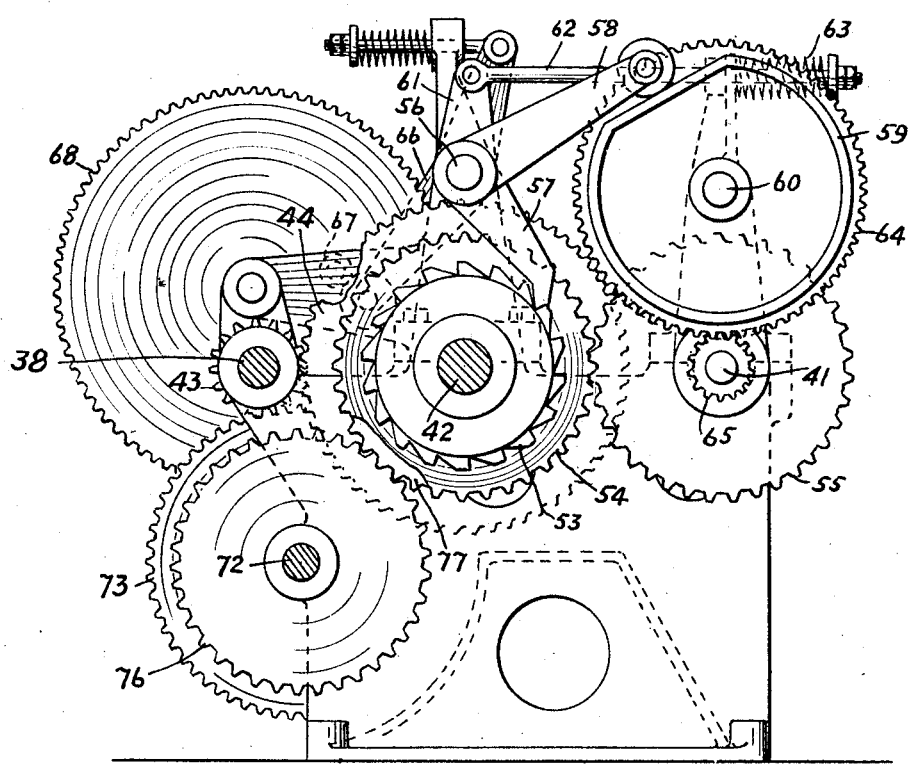
Fig. 6 is an elevational view with parts in section of the lefthand end of the mechanism shown in Fig. 7, and also an elevation in the nature of a section on the line 6—6 of Fig. 1.
Figure 7:
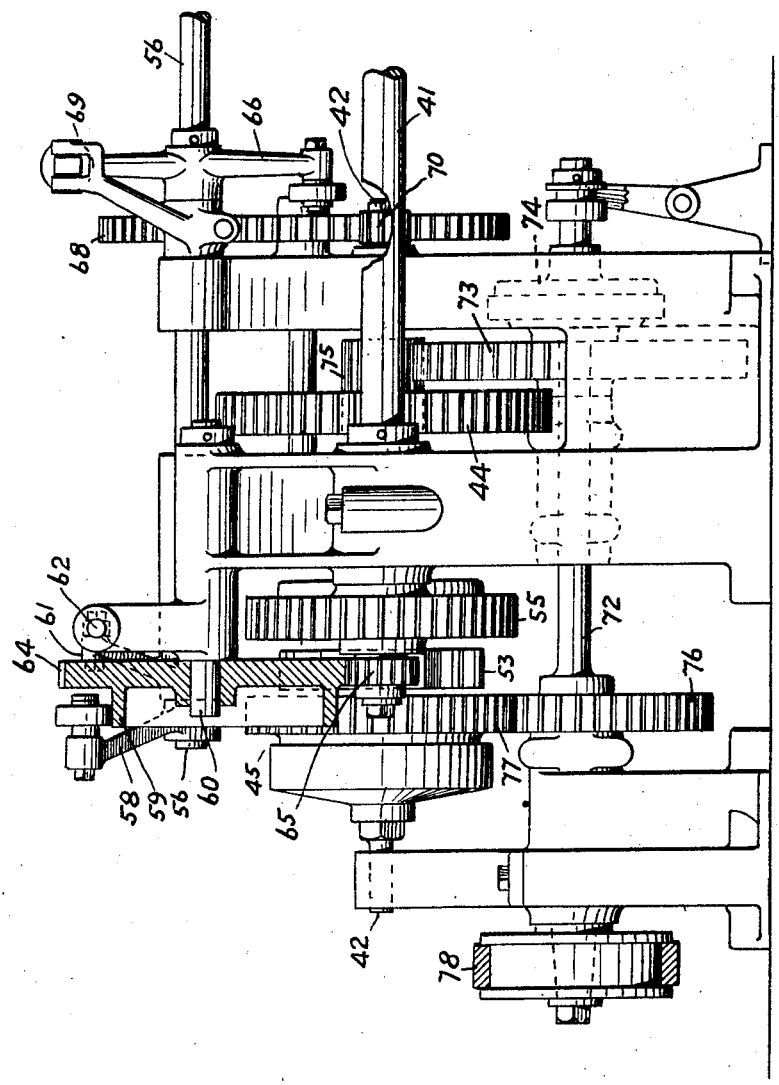
Fig. 7 is a elevation with parts removed of the mechanism indicated at the lefthand in Fig. 1.
Figure 8:
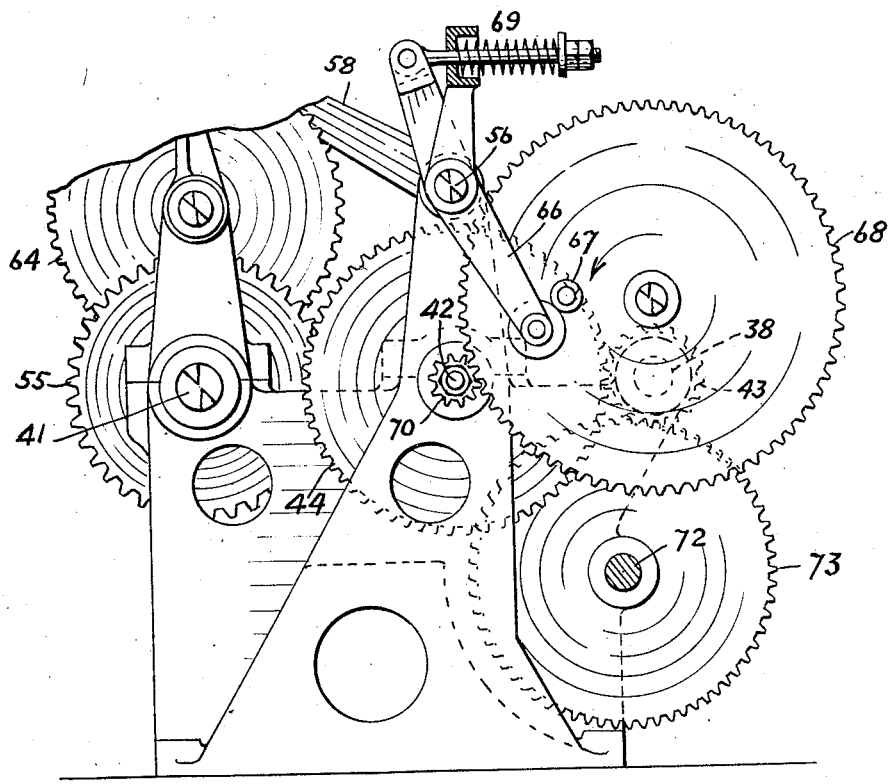
Fig. 8 is an elevational view with parts removed of the righthand end of the mechanism shown in Fig. 7.
Figure 9:
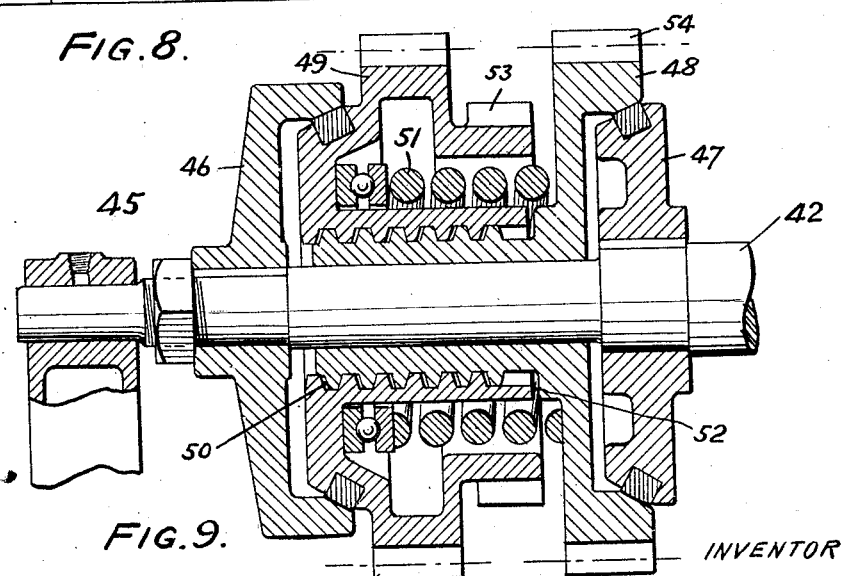
Fig. 9 is a sectional view drawn to an enlarged scale of escapement mechanism shown at the left in Fig. 7 and also in Fig. 1.

There is a turntable, generally indicated at 1, and of circular contour or outline. This turntable carries, as shown, six shockless jarring pattern drawing molding machines 2, 3, 4, 5, 6, and 7, for making sand molds. Each machine makes a complete half mold, alternate machines making a "drag" and "cope". The table is given an intermittent movement remaining stationary for an interval of time and then moving from station to station. The duration of movement and rest are adjusted. A stationary squeezing machine 8 squeezes each mold as it stands in the squeezing position. Empty flasks are put on at the first station 9 and the completed mold is removed at the sixth station 14. At the second station 10 sand is supplied to the flasks. While it is not a part of the present invention it may be remarked that conveyors and overhead hoppers of well understood construction may be employed in the application of the flasks and sand. At the third station 11 the flasks are jar-rammed by the well understood operation of the machines 2—7. At the fourth station 12 the flasks are squeezed by the squeezer 8. At the fifth station 13 the patterns are drawn by the ordinary operation of the machines 2—7. The table is moved or turned from station to station by the driving arm 15 which carries three driving rollers or members 16, 17 and 18. As shown in Fig. 1 the rollers or driving elements 16 and 18 are in mesh with or lie between parallel bars 19 and 20 which form a groove or path through which the roller passes while moving the table between stations. These bars 19 and 20 are attached to the under side of the turntable below each of the machines 2—7. As shown in Fig. 1, which ilustrates the table in a position of rest, the roller 17 is free and not engaged with the table, and the rollers 16 and 18 each meshing with a pair of bars 19 and 20 hold the table locked. When the arm 15 operates it turns the table by a crank motion, starting from rest and accelerating the table speed of rotation for the first half and retarding the table speed of rotation for the second half of its travel, thus starting and stopping the table without shock or jar while moving it at comparatively high speed. For the sake of explanation it may be said that the arm 15 makes two-thirds of a revolution for each one-sixth of a revolution of the table. During a two-thirds revolution of the arm the roller 16 drives, the roller 17 is free and becomes the driver for a following movement, and the roller 18 unlocks. From this, repetitions of movement of the arm 15 and the action of the three rollers or driving elements at the succeeding repetition will be understood. It may be remarked that the result accomplished by the described mechanism and by which the table is stopped and held accurately causes each molding machine to register accurately with the center of the squeezer 8, which is a matter of importance as will be understood by those skilled in the art. The turntable is mounted on a pedestal or column 21, and to facilitate its movement anti-friction bearings 22 are shown in Fig. 2. Around the rim of the turntable are spring supported wheels 23, Fig. 5 upon which rides a rail 24. Mounted on the base of the squeezer 8, Fig. 3, and arranged underneath the table and in alignment with the bars 19 and 20 is a support 25, so that when the squeezer operates upon a molding machine the bars 19 and 20, which normally barely clear the top surface of the support 25, come to a bearing on that surface, the spring wheels 23 yielding, and thus the thrust of the squeezer is taken by the support 25 instead of by the table which is not called upon to resist that thrust. The molding machines are carried by three point supports 26, Fig. 4, arranged in frames 27 on the table, and these frames are shown as braced by struts 28, Fig. 1. Beneath the table is an apron 29 which turns and upon which spilled sand falls, for example, by way of 30 and 31, Fig. 3, and through the grating 32, Fig. 1. There is a conveyer 33, Figs. 1 and 3, running underneath the table and there are scrapers or plows 34 and 35 which deliver the sand to the conveyer 33. 36, Fig. 2, are connections for supplying the molding machine 6 with air under pressure necessary for operating it. The arm 15 is driven through bevel gearing 37, by means which will now be described having reference more particularly to Figs. 1 and 6 to 9. There are three shafts at the same level, Fig. 6. Of these the shaft 38 is a power shaft driven by the constant speed motor 39, Fig. 1, through speed reducing mechanism 40, and this shaft 38 turns constantly in the same direction. The shaft 41 drives the turntable through the bevel gearing 37 and the shaft 41 normally turns in one direction with intervals of rest but it may be turned in the reverse direction in order to turn the table backward in case of necessity or accident. The shaft 42 is geared to the shaft 38 by gears 43 and 44 and so runs continuously. On the shaft 42, Fig. 9, is arranged escapement mechanism, generally indicated by 45. This mechanism includes two clutch elements 46 and 47 keyed to the shaft 42. Between 46 and 47 are two movable clutch elements 48 and 49 having screw thread connection with each other by means of a thread 50 providing clearance which affords some end play. These clutch elements are mounted, 48 loosely on the shaft 42, and 49 on 48 with the screw thread 50 between. There is a spring 51 tending to push 48 and 49 apart. 48 and 49 may bind at the surfaces or hub ends 52. All of this will be hereinafter further explained. On the clutch element 49 there is a ratchet or detent wheel 53 which, if held, releases the clutch elements 49 and 48 from the shaft 42 and holds it at rest and which, if released, permits the spring 51 in cooperation with the screw thread 50 to bind the parts of the clutch to the shaft 42. On the clutch element 48 is a gear 54 which meshes with a gear 55 fast on the shaft 41 so that when the clutch is engaged the shaft 42 through 54 and 55 drives the shaft 41 which drives the turntable, and when the clutch is disengaged the wheel 54 stands still and so does the wheel 55 and also the shaft 41 of the turntable. 56, Fig. 6, is a lay shaft on which is the pawl or detent 57 which holds and releases the ratchet wheel 53. On this shaft 56 is an arm 58 which in cooperation with the cam 59 on the shaft 60 brings the pawl 57 into engagement with the ratchet wheel 53, and the arm 58 is normally held up to the cam 59 by a spring release consisting of the arm 61, rod 62 and spring 63. It is therefore the cam 59 which normally determines when the pawl 57 shall operate to stop the turntable. It will be understood that the cam 59 is driven from and with the shaft 41 by the gears 64 and 65, so that when the turntable stops the cam also stops. To start the turntable by releasing the clutch, Fig. 9, which involves withdrawing the pawl 57 from the wheel 53, use is made of an arm 66 on the shaft 56 and operated by a projection 67 on the wheel 68, which is constantly in motion. The arm 66 is provided with a release mechanism 69 similar to that described in connection with 62 and 63. The wheel 68 is driven by a pinion 70 on the shaft 42, Fig. 8. By changing the gear 68 for a wheel having a different number of teeth the interval during which the turntable and the cam 59 are allowed to remain at rest can be increased or diminished. It may be remarked that on the shaft 56 are hand controls 71, Fig. 1, by which the pawl 57 can be held in place and the table kept at rest even though the projection 67 endeavors to throw the pawl 57 out of action, the spring device yielding for that purpose. It may be here said that in normal operation the high part of the cam 59 holds the detent or pawl 57 out of action after it has been thrown out of engagement by the projection 67. 72 is a countershaft having upon it a loose gear wheel 73 that may be coupled with it and uncoupled from it by a clutch 74. The wheel 73 meshes with a pinion 75, Figs. 6 and 7, which in turn is driven by the shaft 38, so that the wheel 73 is continuously rotated and may or may not be connected with the shaft 72. The shaft 72 has fast upon it a gear 76 which meshes with the gear 77 on the clutch element 49, Fig. 9.

Under some conditions the shaft 42 drives the shaft 72, for example, when the molding machine is functioning normally and the gear wheel 73 runs loose on 72. However, the brake 78 on the shaft 72, which may be an electric brake, when an emergency stop is required, is operated to check the rotation of the shaft 72, thus checking the rotation of the clutch element 49, Fig. 9, which causes the clutch elements 49 and 48 to be screwed together releasing the clutch from the shaft 42 and so stopping the turntable. To run the turntable backward as in the case of accident or emergency, the clutch 74, is operated and it connects the wheel 73 with the shaft 72 which through the gear 76 turns the wheel 77 in reverse direction and thus through the action of the thread 50 the clutch members 48 and 49 bind at 52 and thus the clutch, Fig. 9, being free from the elements 46 and 47, is turned independently of the shaft 42 by power derived from the shaft 72, then driven by wheel 73, so that through wheel 54 the table is turned in reverse direction or run backward.

It will be obvious to those skilled in the art to which the invention relates that modifications may be made in details of construction and arrangement and in matters of mere form without departing from the spirit of the invention which is not limited to such matters or otherwise than the prior art and the appended claims may require.

I claim:

1. In a turntable molding machine a turntable, parallel bars arranged in pairs beneath the table to provide radial ways, an arm turnable about an axis fixed in respect to the table and having three driving rolls arranged at the apices of an equilateral triangle and adapted to cooperate with said ways, and means for turning the arm.

2. In a turntable molding machine a turntable provided with molding machines, bars arranged under the table at the molding machines and providing radial ways, a driving arm turnable about an axis fixed in respect to the table and having three driving elements adapted to cooperate with said ways, spring pressed rollers for normally supporting the moving table near its rim, a squeezer in fixed relation to the table and provided with a support normally clearing the bars but adapted to support them under the shock of the squeezer, and means for turning the arm.

3. In a turntable molding machine a turntable, driving gear for the turntable including a table driving shaft, a constant speed motor, an escapement mechanism including clutch elements comprising a driven clutch element which is, in turn, a table driving element and which is geared to the table driving shaft and comprising driving elements continuously driven from the motor and comprising an element interposed between the driving and driven elements, said last mentioned clutch element having screw threaded connection with the driven element, pawl and ratchet wheel mechanism driven from the table driving clutch element and adapted to disconnect the last mentioned clutch element and stop the table, and rotating mechanism continuously driven from the motor and adapted to throw out the pawl and ratchet wheel mechanism to engage the clutch and start the table.

4. In a turntable molding machine a turntable, driving gear for the turntable including a table driving shaft, a constant speed motor, an escapement mechanism including clutch elements comprising a driven clutch element which is, in turn, a table driving element and which is geared to the table driving shaft and comprising driving elements continuously driven from the motor and comprising an element interposed between the driving and driven elements, said last mentioned clutch element having screw threaded connection with the driven element, pawl and ratchet wheel mechanism driven from the table driving clutch element and adapted to disconnect the last mentioned clutch element and stop the table, rotating mechanism continuously driven from the motor and adapted to throw out the pawl and ratchet wheel mechanism to engage the clutch and start the table, a countershaft geared to an element of the clutch mechanism, and a brake for stopping the countershaft and causing the last mentioned clutch element to free the clutch from the motor and to stop the turntable driving shaft.

5. In a turntable molding machine a turntable, driving gear for the turntable including a table driving shaft, a constant speed motor, an escapement mechanism including clutch elements comprising a driven clutch element which is, in turn, a table driving element and which is geared to the table driving shaft and comprising driving elements continuously driven from the motor and comprising an element interposed between the driving and driven elements, said last mentioned clutch element having screw threaded connection with the driven element, pawl and ratchet wheel mechanism driven from the table driving clutch element and adapted to disconnect the last mentioned clutch element and stop the table, rotating mechanism continuously driven from the motor and adapted to throw out the pawl and ratchet wheel mechanism to engage the clutch and start the table, a countershaft geared to an element of the clutch mechanism, a brake for stopping the countershaft and causing the last mentioned clutch element to free the clutch from the motor and to stop the turntable driving shaft, and manually controlled reversing gear for driving the countershaft backward to free the clutch from the motor and to drive the clutch as a whole and with it the table driving clutch element backwards.

JOHN T. RAMSDEN.